Patented Apr. 1, 1941

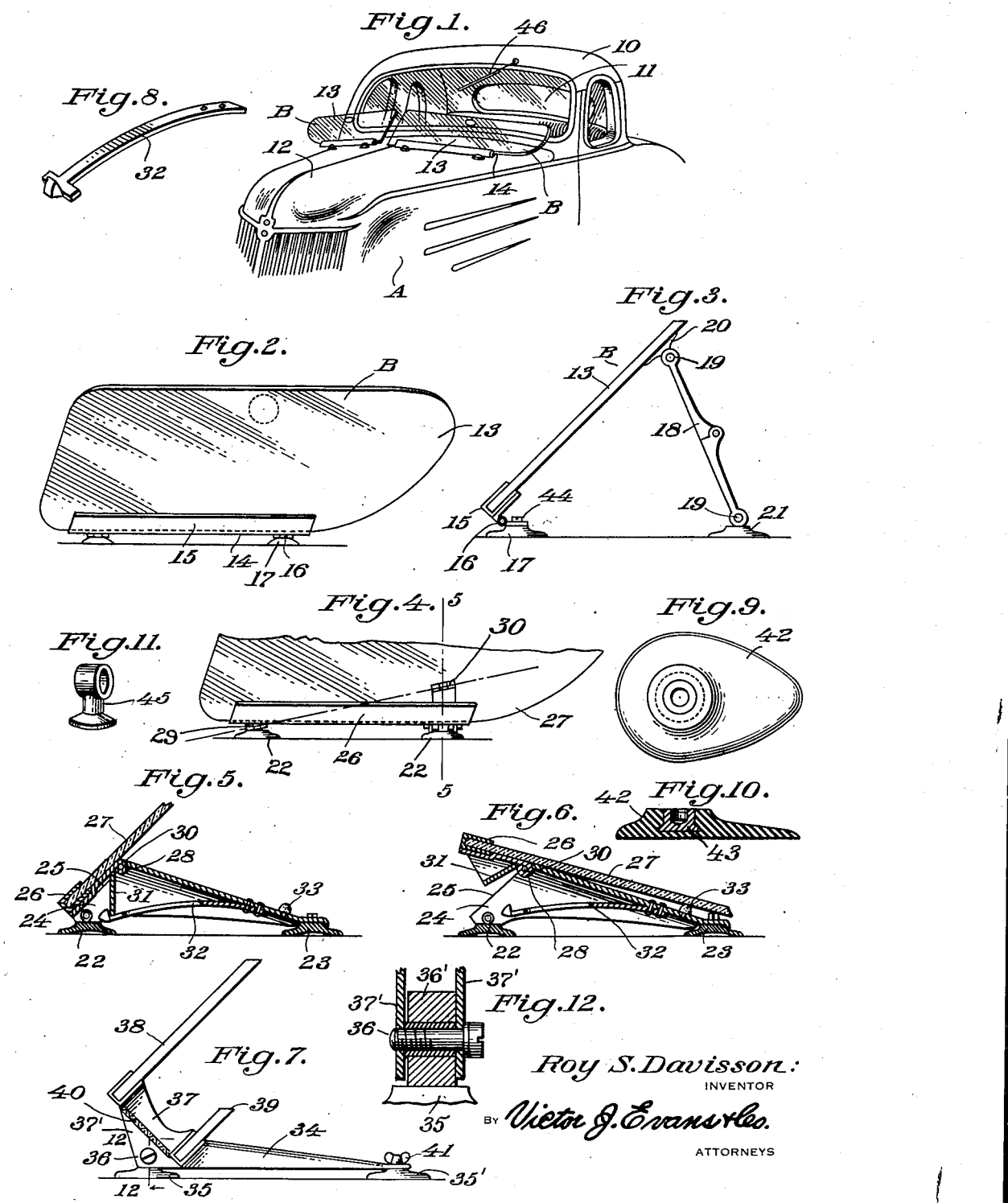

2,236,846

UNITED STATES PATENT OFFICE 2,236,846

SNOW AND INSECT SHIELD

Roy S. Davisson, Waynesfield, Ohio

Application May 10, 1939, Serial No. 272,887

2 Claims. (Cl. 296—91)

The invention relates to an automobile shield and more especially to snow and insect shields intended for use on motor vehicles.

The primary object of the invention is the provision of a shield of this character, wherein insects, snow, sleet and other weather elements as well as dust and dirt will be prevented from striking and adhering to the windshield of a motor vehicle while traveling and in this manner assuring clear vision through the windshield, the said shield being supplemental to a windshield wiper in that the latter is most effective in removing rain or moisture from the windshield while the shield is most effective in keeping the windshield free of insects, road grime and snow, these being hazards against which the windshield wiper is ineffective.

Another object of the invention is the provision of a shield of this character, wherein in the use thereof wind pressure against the windshield of a motor vehicle is relieved and in those cases where the windshield is of the hinged type opening from the bottom thereof the same can be readily and easily opened at high speeds of travel of the vehicle due to the low air pressure against the same, and when the windshield is open, insects can not pass through the open windshield as well as eliminating the roaring of the wind about such windshield.

Another object of the invention is the provision of a shield of this character, wherein the accumulation of frost at the inside of the windshield is relieved when a motor vehicle is in motion because the air blast in the direction of the windshield will be deflected over the top of the vehicle without permitting it to strike the windshield directly, the formation of ice on the outside of the windshield being also prevented for the above reasons while snow and sleet will be carried over the top of the vehicle without striking and sticking to the windshield.

A further object of the invention is the provision of a shield of this character, two in number being used on motor vehicles forwardly of the windshield, and the same constitute deflectors for preventing splash against the windshield, the striking of insects thereon, and such shield may be conveniently lowered from working position so as not to interfere with the raising of the hood of the vehicle and being adjustable from the line of vision of an operator of the vehicle, particularly when raining, so as to avoid interference with vision in the driving of the vehicle.

A still further object of the invention is the provision of a shield of this character, which is simple in its construction, being streamlined in effect, both in design and in the application to a motor vehicle, susceptible of quick mounting and demounting, readily and easily adjustable, thoroughly reliable and efficient in operation, avoiding damage to the hood when in working position, and inexpensive to manufacture and install.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claims hereunto appended.

In the accompanying drawing:

Figure 1 is a fragmentary perspective view of a motor vehicle showing a pair of the shields constructed in accordance with the invention applied and in working position.

Figure 2 is a front elevation of one of the shields.

Figure 3 is an end view thereof.

Figure 4 is a view similar to Figure 2 showing a slight modification.

Figure 5 is a sectional view on the line 5—5 of Figure 4.

Figure 6 is a view similar to Figure 5 showing the shield in a lowered or adjusted position.

Figure 7 is an edge elevation of a further modification of the invention.

Figure 8 is a perspective view of a spring part for the modification shown in Figures 4, 5 and 6.

Figure 9 is a top plan view of a modified form of suction cup used with the shield.

Figure 10 is a vertical sectional view thereof.

Figure 11 is a perspective view of an eye fitting for the suction cup.

Figure 12 is a sectional view on the line 12—12 of Figure 7, being on an enlarged scale.

Similar reference characters indicate corresponding parts throughout the several views in the drawing.

Referring to the drawing in detail, particularly Figures 1 to 3, inclusive, A designates generally a portion of a motor vehicle involving a body 10, a windshield 11 and a side hinged hood setup 12, respectively, being conventional in the entirety. Adapted to be mounted upon the vehicle is the shield constituting the present invention and hereinafter fully described.

It is essential that two shields be employed for successful operation in the use thereof upon a vehicle of the motor type and these shields are denoted generally at B, each comprising a glass plate 13, although it may be made from any other transparent material satisfactorily serving the purposes intended. The plate 13 is cut with rounded edges at the corners thereof to give streamlined effect while the lower straight run edge 14 of this plate 13 is seated within a correspondingly straight elongated channeled holder 15, the said plate being permanently fitted therein. This holder 15 through spaced hinges 16 has connection with a pair of inherently resilient suction cups 17 for vertical swing.

Associated with the plate 13 is a break hinge jointed brace 18, which at opposite ends has hinge connection at 19 with suction cups 20 and 21, respectively. The cup 20 is engaged with the plate 13 at the rear face thereof while the cup 21 is engageable with the hood 12 or the body 10 of the vehicle A. In the latter instance when the cup 21 engages with the body 10, the said cup is disposed below the windshield 11. The cups 17 are engaged with the hood 12 in the mounting of the shield upon the vehicle and in this way each shield B is mounted for service at opposite sides of the longitudinal axis of the vehicle so as to prevent insects, weather elements and foreign matter striking and adhering to the windshield when the vehicle is in motion. The brace 18 in extended position sustains the shield, that is, the plate 13 thereof, at a forward angle in advance or forwardly of the windshield 11 and in this position wind blast is deflected upwardly over the top of the body 10 of the vehicle A when such vehicle is in motion and in this way relieving wind pressure upon the windshield.

The rubber suction cups 17 and 21 engaged with the vehicle avoid any damage to the finished surface thereof and fixedly hold the shield in a working position. It is preferable that the cups 17 and 21 be mounted directly upon the hinge section of the hood 12 and when it is desired to raise this section of the hood, the brace 18 is folded for the lowering of the plate 13 and thus avoiding interference in the raising movement of the section of the hood of the vehicle.

In Figures 4, 5 and 6 of the drawing there is shown a slight modification wherein fore and aft suction cups 22 and 23, respectively, are fitted to a substantially triangular shaped bridge or carrier bracket 24, being formed with the forwardly inclined front edge 25 and is of substantially inverted U-shape in cross section rearwardly of the said edge 25 for a major longitudinal extent thereof, while the vertically swingable holder 26 for the glass plate 27 has the hinge connection 28 with this bridge or bracket 24, being one bracket or bridge for each holder. There is only one cup 23 aft for each shield in this modified form of construction. The said holder 26 at a point distanced from the bridge or bracket has hinge connection 29 with a suction cup 30, the pintle axes of the hinges 28 and 29 being aligned with each other at an angle to the horizontal and in this manner the shield will assume the set position when mounted upon the motor vehicle, as shown in Figure 4 of the drawing, the cups 22, 23 and 30 being engaged with such vehicle similarly to the cups 17 and 21 for the proper mounting of the shield. The hinged connection 28 is formed with a keeper 31 for engaging a leaf spring latch 32 fitted within the bridge or bracket 24 so that the plate 27 can be latched in a working position and also is susceptible of being lowered from the working position shown in Figure 5 to an inactive position shown in Figure 6 of the drawing. The bridge or bracket 24 carries a bumper 33 for the plate 27 when in a lowered inactive position.

In Figures 7 and 12 of the drawing there is shown a further modification of the invention wherein the carrier 37 is provided adjacent each end with two spaced downwardly extending plates 37' between which extend the shanks 36', carried by the cups 35, and are secured in their adjusted position by means of the screws 36. Carried by the carrier are a pair of spaced glass plates 38 and 39. Secured to the carrier is a bracket 34, having at its rear end a suction cup 35', fastened thereto by the winged nut 41. The plate 38 is spaced forwardly with relation to the plate 39 and the latter is of less height than said plate 38, both plates being disposed at a forward angle, and the holder 37 has bridging the space between the plates 38 and 39 at the lowermost edges a wire mesh screen 40.

This construction of double plates allows air draft therebetween without the passage of insects with the air currents flowing between said plates in the use of the shield.

This construction of double plate formation of a shield results in greater efficiency so that the whole assembly extends upward approximately two-thirds the height of the single plate design and in this double plate design the air coming in under the forward plate 38 is deflected by the lower secondary plate 39 up behind the forward plate, thus eliminating eddies and friction at the top of the forward plate 38 and resulting in smooth air flow upward and over the top of the vehicle. The plates 38 and 39 in their arrangement are parallel with each other.

This design of shield just described is mounted and positioned similarly to the single plate shield hereinbefore set forth.

In Figures 9 and 10 of the drawing there is shown a modified form of suction cup wherein the body 42 of the cup is of a streamlined formation and has anchored therein an internally threaded female socket piece 43 for a fastener, as at 44, for detachable mounting of the cup to the shield.

In Figure 11 of the drawing there is shown an eye fitting 45 for the cup 22 in Figures 4, 5 and 6. This eye fitting is anchored within the cup.

The modified form of shield shown in Figure 7 of the drawing is of such a type that it does not require lowering in the use thereof upon a vehicle as the plates 38 and 39 do not rise in height into the driver's line of vision through the windshield 11 in the driving of the vehicle while in the single plate type of shield the glass plate thereof is of a height that may require the lowering thereof when in use upon a motor vehicle, particularly when the latter is being driven in the rain, and in this lowered position the windshield wiper 46 is operated for giving clear vision through the windshield 11 during the rainy period.

Again with reference to the structure shown in Figure 7, by reason of the connection 36 with the bridge or bracket 34, the latter is susceptible of forward swing by releasing the winged fastener 41 from the cup 35 and in this way the shield will not interfere with the other shield on the lift of the hood section at one side of the vehicle as the shield in the closed other side will be cleared. This operation is required so that either shield of a pair mounted upon a vehicle will not interfere with the other when it is necessary to raise the hood section of the side hinge type.

With reference to the shield shown in Figures 4, 5 and 6 of the drawing, the edge 25 of the bridge contacts with the holder 26 when the plate 27 is in a raised forwardly inclined position, thus eliminating the vertical swing of the said plate in the raising movement thereof to working position.

The top edges of the shields are bevel ground to eliminate interference with vision. The mounting of the shields is practical on hoods hinged at their rear as the same do not interfere with the vertical lifting of such hoods.

What is claimed is:

1. A shield for an automobile having a hood, comprising suction cups demountably fixed to said hood in spaced relation to each other, a carrier connected to the said suction cups, a transparent section fitting said carrier for angular disposition relative to said hood, a second transparent section carried by said carrier spaced from the first transparent section and held angularly by the same, and a bracket connected with the carrier and a suction cup carried by the rear end of the bracket for sustaining the said transparent sections angled to the vertical with respect to said hood.

2. A shield for an automobile having a hood, comprising suction cups demountably fixed to said hood in spaced relation to each other, a carrier connected to the said suction cups, a transparent section fitting said carrier for angular disposition relative to said hood, a second transparent section carried by said carrier and spaced from the first transparent section and held angularly by the same, a bracket connected with the carrier, a suction cup carried by the rear end of the bracket for sustaining the said transparent sections angled to the vertical with respect to said hood, and pivot means for sustaining the transparent sections in fixed supported position by said suction cups on irregular surfaces.

ROY S. DAVISSON.